(12) United States Patent
Kim

(10) Patent No.: US 11,064,274 B2
(45) Date of Patent: Jul. 13, 2021

(54) DISPLAY APPARATUS

(71) Applicant: LG Display Co., Ltd., Seoul (KR)

(72) Inventor: SeYoung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/537,942

(22) Filed: Aug. 12, 2019

(65) Prior Publication Data

US 2020/0053441 A1 Feb. 13, 2020

(30) Foreign Application Priority Data

Aug. 13, 2018 (KR) .................. 10-2018-0094396

(51) Int. Cl.
*H04R 9/02* (2006.01)
*G06F 3/041* (2006.01)
*H04R 1/02* (2006.01)
*G06F 3/0488* (2013.01)

(52) U.S. Cl.
CPC ............. *H04R 1/02* (2013.01); *G06F 3/0488* (2013.01); *H04R 9/02* (2013.01); *H04R 2499/15* (2013.01)

(58) Field of Classification Search
CPC ........ H04R 1/02; H04R 9/02; H04R 2499/15; G06F 3/0488; G06F 3/0414
See application file for complete search history.

(56) References Cited

U.S. PATENT DOCUMENTS

| | | | | |
|---|---|---|---|---|
| 5,186,629 A * | 2/1993 | Rohen | ..................... | G06F 3/016 340/4.12 |
| 6,697,044 B2 * | 2/2004 | Shahoian | ................ | A63F 13/06 345/156 |
| 7,020,302 B2 * | 3/2006 | Konishi | ................... | H04M 1/03 381/423 |
| 7,113,813 B2 * | 9/2006 | Shimokawatoko | ......................... | H04M 1/0214 181/189 |
| 7,218,743 B2 * | 5/2007 | Sumiyama | ............. | H04R 1/025 381/186 |
| 7,346,315 B2 * | 3/2008 | Zurek | ..................... | H04M 1/03 381/335 |
| 7,460,679 B2 * | 12/2008 | Itoh | ........................ | H04R 1/021 381/182 |
| 8,437,494 B2 * | 5/2013 | Suzuki | ................... | H04R 1/025 381/386 |
| 8,816,981 B2 * | 8/2014 | Kai | ....................... | G06F 1/1626 345/173 |

(Continued)

FOREIGN PATENT DOCUMENTS

CN 103869523 A 6/2014
CN 104143292 A 11/2014

(Continued)

OTHER PUBLICATIONS

First Notification of Office Action dated Oct. 9, 2020, issued in corresponding Chinese Patent Application No. 201910739203.5.

*Primary Examiner* — Nitin Patel
*Assistant Examiner* — Robert M Stone
(74) *Attorney, Agent, or Firm* — Morgan, Lewis & Bockius LLP

(57) ABSTRACT

A display apparatus includes: a display panel, and a vibration generator including a plurality of sound-generating modules configured to vibrate the display panel, the plurality of sound-generating modules being configured as touch sensors for sensing a touch pressure applied to the display panel.

16 Claims, 8 Drawing Sheets

(56) References Cited

U.S. PATENT DOCUMENTS

| | | | |
|---|---|---|---|
| 9,813,060 B2* | 11/2017 | Ehrensperger | E04C 2/043 |
| 9,818,805 B2* | 11/2017 | Choi | H01L 27/3262 |
| 10,216,231 B1* | 2/2019 | Landick | H04R 9/066 |
| 10,387,105 B2* | 8/2019 | Ozcan | G06F 3/03 |
| 10,416,707 B2* | 9/2019 | Choi | H04R 7/045 |
| 2003/0003879 A1* | 1/2003 | Saiki | H04R 1/028 |
| | | | 455/575.1 |
| 2006/0109256 A1* | 5/2006 | Grant | G06F 3/016 |
| | | | 345/173 |
| 2006/0147051 A1* | 7/2006 | Smith | G10K 11/172 |
| | | | 381/71.2 |
| 2008/0216578 A1* | 9/2008 | Takashima | G06F 3/0414 |
| | | | 73/658 |
| 2013/0182878 A1* | 7/2013 | Liu | H04R 7/045 |
| | | | 381/333 |
| 2013/0241629 A1* | 9/2013 | Ehrensperger | H01H 11/00 |
| | | | 327/516 |
| 2014/0022189 A1* | 1/2014 | Sheng | G06F 3/0416 |
| | | | 345/173 |
| 2014/0160040 A1 | 6/2014 | Kang et al. | |
| 2014/0321690 A1* | 10/2014 | Reining | H04R 9/041 |
| | | | 381/396 |
| 2014/0334078 A1 | 11/2014 | Lee et al. | |
| 2016/0195931 A1* | 7/2016 | Czelnik | G06F 3/167 |
| | | | 345/173 |
| 2017/0289694 A1* | 10/2017 | Choi | G06F 1/1626 |
| 2017/0364155 A1* | 12/2017 | Billington | H02J 7/025 |
| 2018/0107378 A1* | 4/2018 | Rosenberg | G06F 3/04883 |
| 2018/0321784 A1* | 11/2018 | Park | G06K 9/00053 |
| 2018/0328799 A1* | 11/2018 | Park | G06F 3/044 |
| 2019/0025133 A1* | 1/2019 | Lee | G01K 7/02 |
| 2019/0079583 A1* | 3/2019 | Alghooneh | G06F 1/1643 |
| 2019/0339776 A1* | 11/2019 | Rosenberg | G06F 3/047 |
| 2020/0296515 A1* | 9/2020 | Starnes | H04R 9/06 |

FOREIGN PATENT DOCUMENTS

| | | |
|---|---|---|
| CN | 105759956 A | 7/2016 |
| CN | 107295446 A | 10/2017 |
| JP | H02-176721 A | 7/1990 |

* cited by examiner

DISPLAY APPARATUS

CROSS-REFERENCE TO RELATED APPLICATION(S)

This application claims the benefit of and priority to Korean Patent Applications No. 10-2018-0094396, filed on Aug. 13, 2018, the entirety of which is hereby incorporated by reference.

BACKGROUND

1. Technical Field

The present disclosure relates to a display apparatus.

2. Discussion of the Related Art

Recently, with the advancement of the information age, a display field for visually displaying an electric information signal has been rapidly developed. In response to this trend, various display apparatuses, having excellent properties of a thin profile, light weight, and low power consumption, have been developed. Examples of the display apparatuses may include a liquid crystal display (LCD) apparatus, a field emission display (FED) apparatus, and an organic light-emitting display (OLED) apparatus.

Among the display apparatuses, the liquid crystal display apparatus may include an array substrate including a thin film transistor, an upper substrate including a color filter and/or a black matrix, and a liquid crystal layer between the array substrate and the upper substrate. An arrangement state of the liquid crystal layer is controlled in accordance with an electric field applied between two electrodes in a pixel area, and transmittance of light is controlled in accordance with the arrangement state of the liquid crystal layer to display an image.

The organic light-emitting display apparatus is a self-light-emitting diode, and is more advantageous than the other display apparatuses in view of a fast response speed, light emission efficiency, luminance, and a viewing angle. Therefore, the organic light-emitting display apparatus has widely received attention.

Generally, display apparatuses display an image on a display panel, but need a separate speaker to provide sound. If the speaker is provided in the display apparatus, a progressive direction of sound generated through the speaker is toward a side end or upper and lower ends of the display panel where an image may be displayed, instead of toward a front surface or a rear surface of the display panel, whereby the sound does not move toward a viewer who views an image on the front surface of the display panel. Therefore, a problem may occur in that the source interrupts an immersion level of a viewer who views an image. If a speaker is included in a set apparatus, such as TV, is configured, because the speaker occupies a certain space, a problem occurs in that there is a restriction in design and space arrangement of the set apparatus.

Also, it is presumed that an input device is provided in the display apparatus. For example, if the input device is arranged on the front surface of the display panel, an area of a display area is reduced, and if the input device is arranged on a side or rear surface of the display panel, problems may occur in view of restrictions according to design and configuration of the set apparatus and users' inconvenience.

SUMMARY

Accordingly, the present disclosure is directed to a display apparatus that substantially obviates one or more of the issues due to limitations and disadvantages of the related art.

An aspect of the present disclosure is to provide a display apparatus including a vibration generator used as a touch sensor for sensing a touch pressure applied to a display panel.

Another aspect of the present disclosure is to provide a display apparatus that does not may include a separate input device for sensing a touch pressure applied into a display area of a display panel.

Another aspect of the present disclosure is to provide a display apparatus that senses intensity of a touch area and a touch pressure on a display panel by sensing a touch signal generated from a vibration generator.

Another aspect of the present disclosure is to provide a display apparatus that senses intensity of a touch area and a touch pressure on a display panel, and outputs sound toward the front of the display panel during a sound-generating period.

Another aspect of the present disclosure is to provide a display apparatus that senses intensity of a touch area and a touch pressure on a display panel while sound is being output toward the front of the display panel.

Another aspect of the present disclosure is to provide a display apparatus that improves a design aesthetic sense by omitting a space in which a speaker and an input device would be separately provided, in addition to providing a display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel, and a vibration generator including a plurality of sound-generating modules configured to vibrate the display panel, the plurality of sound-generating modules being configured as touch sensors for sensing a touch pressure applied to the display panel.

In another aspect, there is provided a display apparatus, comprising: a display panel; a vibration generator comprising a plurality of sound-generating modules configured to vibrate the display panel, the plurality of sound-generating modules configured as touch sensors for sensing a touch pressure applied to the display panel; a rear structure supporting the display panel, and comprising a hole into which the vibration generator is partially inserted; a touch sensor for configured to output a touch sensing value by sensing a touch signal based on an induced current generated from each of the plurality of sound-generating modules by the touch pressure; and a sound driver configured to supply a sound signal to each of the plurality of sound-generating modules.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
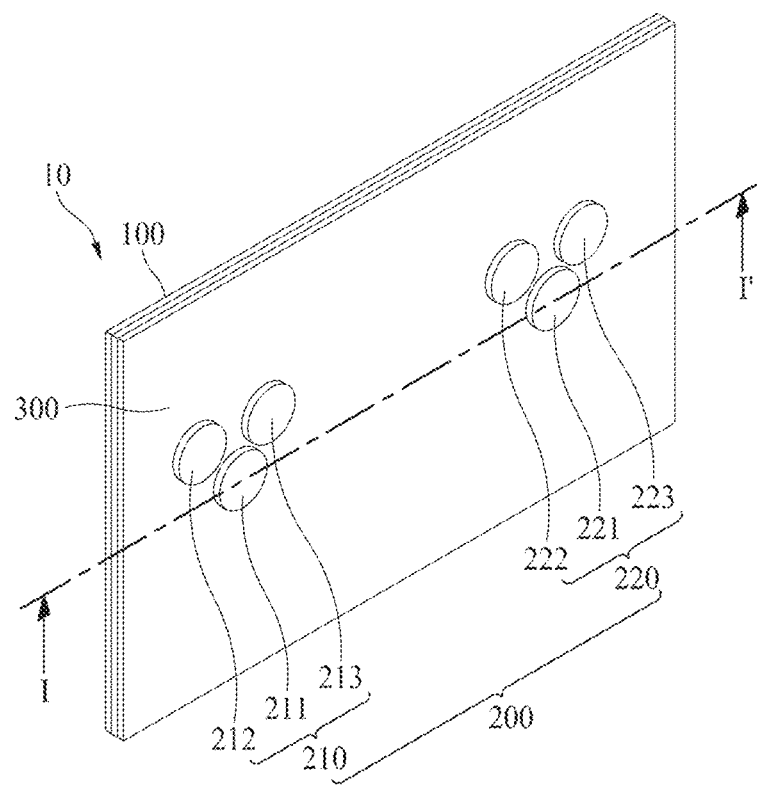
FIG. 1 is a perspective view illustrating a display apparatus according to one embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In the present disclosure, examples of a display apparatus may include a narrow-sense display apparatus, such as an organic light-emitting display (OLED) module or a liquid crystal module (LCM) including a display panel and a driver for driving the display panel. Also, examples of the display apparatus may include a set device (or a set apparatus) or a set electronic device, such as a notebook computer, a television (TV), a computer monitor, an equipment apparatus including an automotive apparatus or another type apparatuses for vehicles, or a mobile electronic device, such as a smartphone or an electronic pad, which is a complete product (or a final product) including an LCM or an OLED module. Therefore, in the present disclosure, examples of the display apparatus may include a narrow-sense display apparatus itself, such as an LCM or an OLED module, and a set device, which is a final consumer device or an application product including the LCM or the OLED module.

In some embodiments, an LCM or an OLED module including a display panel and a driver may be referred to as a narrow-sense display apparatus, and an electronic device, which is a final product including an LCM or an OLED module, may be referred to as a "set device." For example, the narrow-sense display apparatus may include a display panel, such as an LCD or an OLED, and a source printed circuit board (PCB), which is a controller for driving the display panel. The set device may further may include a set PCB, which is a set controller electrically connected to the source PCB to overall control the set device.

A display panel applied to the present embodiment may use any type of display panel, such as a liquid crystal display panel, an organic light-emitting diode (OLED) display panel, and an electroluminescent display panel, but is not limited to any specific type of display panel that is vibrated by a sound generation device according to the present embodiment to output sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin-film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light-emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT that is an element for selectively applying a voltage to each of the pixels, an organic light-emitting device layer on the array substrate, and an encapsulation substrate disposed on the array substrate to cover the organic light-emitting device layer. The encapsulation substrate may protect the TFT and the organic light-emitting device layer from an external impact, and may reduce or prevent water or oxygen from penetrating into the organic light-emitting device layer. Also, a layer provided on the array substrate may include an inorganic light-emitting layer (for example, a nano-sized material layer, a quantum dot, or the like). As another example, the layer provided on the array substrate may include a micro light-emitting diode.

The display panel may further may include a backing, such as a metal plate attached to the display panel. However, embodiments are not limited to the metal plate, and the display panel may include another structure.

Hereinafter, a display apparatus according to an embodiment of the present disclosure will be described in detail with reference to the accompanying drawings.

Figure 2:
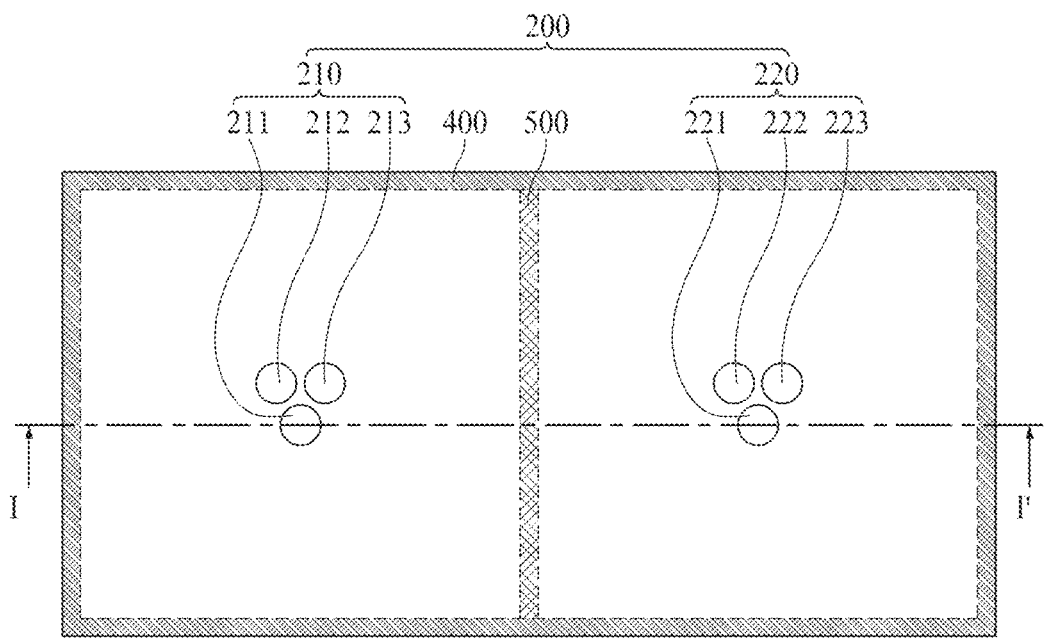
FIG. 2 is a rear view illustrating a display apparatus of FIG. 1.
Figure 3:
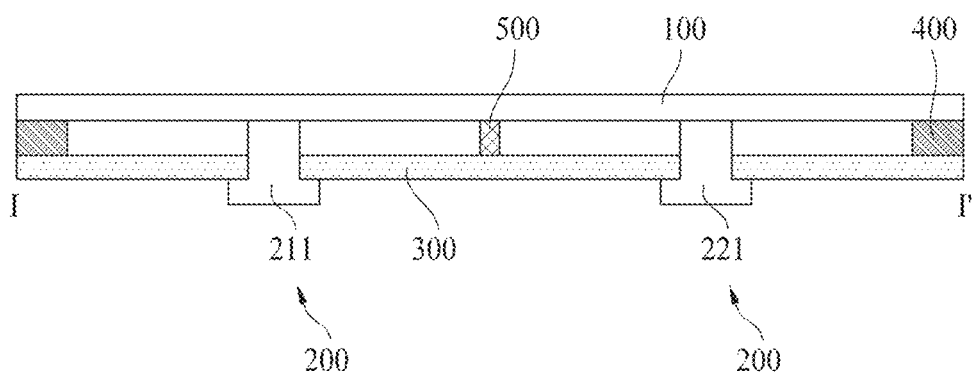
FIG. 3 is a cross-sectional view taken along line I-I' of FIG. 1.

FIG. 1 is a perspective view illustrating a display apparatus according to one embodiment of the present disclosure. FIG. 2 is a rear view illustrating a display apparatus of FIG. 1. FIG. 3 is a cross-sectional view taken along line I-I' of FIG. 1.

With reference to the examples of FIGS. 1 to 3, the display apparatus 10 may include a display panel 100, a vibration generator 200, a rear structure 300, an adhesive member 400, and a partition 500. The display panel 100 may display an image, and may be embodied as any kind of display panel, such as a liquid crystal display panel, an organic light-emitting diode (OLED) display panel, and an electroluminescent display panel. The display panel 100 may be vibrated by vibration of the vibration generator 200 to output sound.

The vibration generator 200 may include at least one vibration module for vibrating the display panel 100. The vibration generator 200 may be fixed to the rear structure 300, and may vibrate the display panel 100 to output sound to the front of the display panel 100. For example, the vibration generator 200 may generate sound using the display panel 100 as a vibration panel.

According to one example, the vibration generator 200 may be in contact with a rear surface of the display panel 100 by passing through the rear structure 300, thereby directly vibrating the display panel 100. An upper portion of the vibration generator 200 may be inserted into a hole, e.g., borehole, provided in the rear structure 300, and may be connected to the rear surface of the display panel 100. A lower portion of the vibration generator 200 may be in contact with a rear surface of the rear structure 300, and then may be fixed in position. Therefore, the vibration generator 200 may be vibrated in accordance with a sound signal related to image using the rear structure 300 as a support to vibrate the display panel 100, and the display panel 100 may output sound to the front.

According to one example, the vibration generator 200 may include first and second vibration generators 210 and 220 for vibrating different areas of the display panel 100. The first and second vibration generators 210 and 220 may respectively be fixed through the rear structure 300, and may be spaced apart from each other. For example, the first vibration generator 210 may be arranged at a left side of the rear surface of the display panel 100 to vibrate a left area of the display panel 100, and the second vibration generator 220 may be arranged at a right side of the rear surface of the display panel 100 to vibrate a right area of the display panel 100. It should be appreciated that the terms "left" and "right" are used herein for convenience of description, and are interchangeable, as would be understood to one of ordinary skill in the art. The first and second vibration generators 210 and 220 may be independently driven by receiving their respective sound signals. For example, the first vibration generator 210 may generate sound using the left area of the display panel 100 as a vibration panel, and the second vibration generator 220 may generate a sound using the right area of the display panel 100 as a vibration panel.

Each of the first and second vibration generators 210 and 220 may include a plurality of sound-generating modules. For example, the first vibration generator 210 may include first to third sound-generating modules 211, 212, and 213, and the second vibration generator 212 may include fourth to sixth sound-generating modules 221, 222, and 223. For example, when the first to third sound-generating modules 211, 212, and 213 are different from the fourth to sixth sound-generating modules 221, 222, and 223 only in that they may vibrate the left area versus the right area of the display panel 100, description of technical features of the fourth to sixth sound-generating modules 221, 222, and 223 that is the same as those of the first to third sound-generating modules 211, 212, and 213 will be omitted. The first to third sound-generating modules 211, 212, and 213 may be adjacent to or may be spaced apart from one another. According to one example, the first to third sound-generating modules 211, 212, and 213 may be spaced apart from one another.

Each of the first to third sound-generating modules 211, 212, and 213 may be used as a touch sensor for sensing a touch pressure applied to the display panel 100. For example, if the touch pressure is applied to the front surface of the display panel 100, the touch pressure may be transferred to each of the first to third sound-generating modules 211, 212, and 213, and an induced current may be generated in each of the first to third sound-generating modules 211, 212, and 213. For example, different induced currents may be generated in the first to third sound-generating modules 211, 212, and 213 in accordance with a position to which a touch pressure is applied. The induced current (or touch signal) generated in each of the first to third sound-generating modules 211, 212, and 213 may be sensed by a touch sensor. The touch sensor will be described in detail with reference to the example of FIG. 7.

According to one example, the vibration generator 200 may be a speaker, and may be, but is not limited to, a sound actuator, a sound exciter, or a piezoelectric element. The vibration generator 200 may be a sound system that outputs sound in accordance with an electrical signal.

The rear structure 300 may be on the rear surface of the display panel 100, and may support the display panel 100. For example, the rear structure 300 may be spaced apart from the display panel 100, and may support the vibration generator 200 that has passed through the rear structure 300.

The rear structure 300 may cover the entire rear surface of the display panel 100, may be spaced from the rear surface of the display panel 100, and may have a flat panel shape including, e.g., a glass material, a metal material, or a plastic material. For example, an edge portion or a sharp corner portion of the rear structure 300 may have a four-sided shape or a curved shape, e.g., by a chamfering process or a corner rounding process. According to one example, the rear structure 300 of a glass material may be a sapphire glass. For example, the rear structure 300 of a metal material may include, but is not limited to, one or more of: aluminum (Al), an Al alloy, a magnesium (Mg) alloy, and an alloy of iron (Fe) and nickel (Ni). For another example, the rear structure 300 may have a deposited structure of a metal plate and a glass plate, facing the rear surface of the display panel 100. For example, the rear surface of the display apparatus 10 may be used as a mirror surface by the metal plate.

The rear structure 300 may include a hole, e.g., borehole, into which the vibration generator 200 may be partially inserted. The hole, e.g., borehole, may be bored in a partial area of the rear structure 300 along a thickness direction of the rear structure 300, and may have a circular or polygonal shape.

The adhesive member 400 may be between an edge of the display panel 100 and an edge of the rear structure 300, and may adhere the display panel 100 and the rear structure 300 to each other. According to one example, the adhesive member 400 may be embodied as, but is not limited to, a double-sided tape. The adhesive member 400 may seal a space between the display panel 100 and the rear structure 300.

The partition 500 may be between the display panel 100 and the rear structure 300. According to one example, the partition 500 may be between the first and second vibration generators 210 and 220, and may partition the area where the first and second vibration generators 210 and 220 may be arranged. For example, the first vibration generator 210 may vibrate the left area of the display panel 100, and the second vibration generator 220 may vibrate the right area of the display panel 100. Therefore, the partition 500 may reduce or prevent interference between sounds generated from the left area and the right area of the display panel 100 from occurring.

According to one example, the partition 500 may be, but is not limited to, an enclosure or a baffle. For example, the partition 500 may include, but is not limited to, polyurethane or polyolefin. Also, the partition 500 may include, but is not limited to, one-sided tape or double-sided tape, or may include a material having elasticity to be compressed to a certain level.

The partition 500 may split left and right sounds generated from the first and second vibration generators 210 and 220. When the partition 500 attenuates or absorbs vibration of the display panel 100 at the center of the display panel 100, the sound at the left area of the display panel 100 may be shielded from being transferred to the right area of the display panel 100. Therefore, the partition 500 may split left and right sounds, and may improve sound output property. According to one example, the partition 500 may allow sound in the form of a 2.0 channel to be output from the display panel 100 in accordance with vibration of the display panel 100 by splitting the sounds between the first and second vibration generators 210 and 220.

Figure 4:
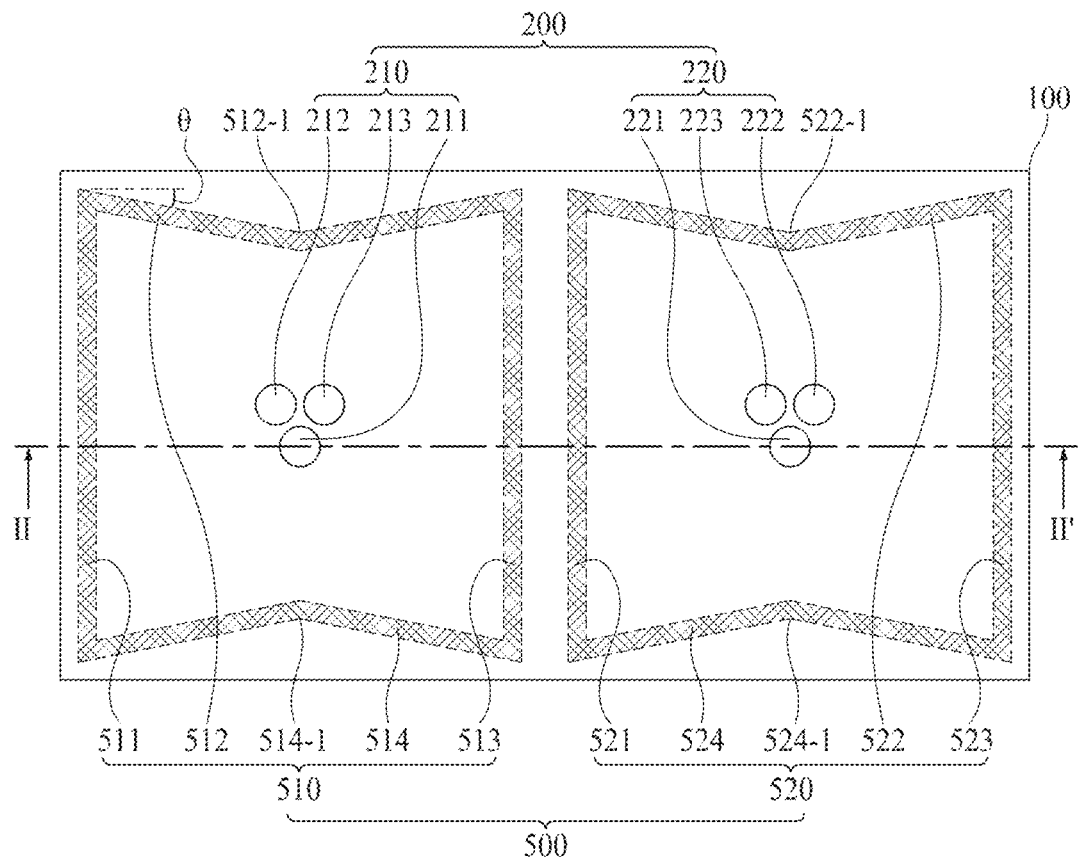
FIG. 4 is a rear view illustrating a display apparatus according to another embodiment of the present disclosure.
Figure 5:
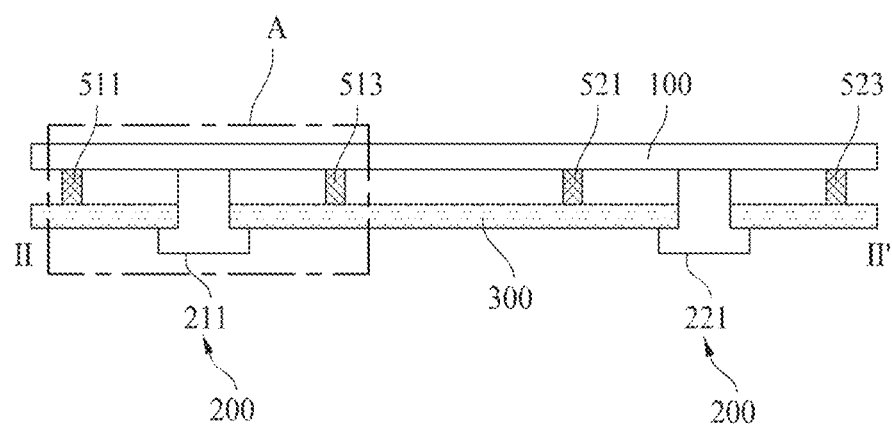
FIG. 5 is a cross-sectional view taken along line II-II' of FIG. 4.

FIG. 4 is a rear view illustrating a display apparatus according to another embodiment of the present disclosure. FIG. 5 is a cross-sectional view taken along line II-II' of FIG. 4.

The display apparatus of the examples of FIGS. 4 and 5 is different from the examples of FIGS. 1 to 3 in that the partition 500 may be modified. Hereinafter, description will be given based on the partition 500, and repeated description of the other elements will be omitted or briefly made.

With reference to the examples of FIGS. 4 and 5, the partition 500 may include a first partition 510 and a second partition 520. The display panel 100 may include a left area and a right area, the first partition 510 may surround the left area of the display panel 100, and the partition 520 may surround the right area of the display panel 100. For example, the first partition 510 or the second partition 520 may be arranged along four sides outside the left area or the right area of the display panel 100. Each of the first and second partitions 510 and 520 may allow the sound to output toward only the front of the display panel 100 by shielding the sound from leaking through each side of the display panel 100, whereby a sound output property may be improved.

Each of the first and second partitions 510 and 520 may have four sides. For example, the first partition 510 may include first to fourth sides 511, 512, 513, and 514, and the second partition 520 may include fifth to eighth sides 521, 522, 523, and 524. For example, when the first to fourth sides 511, 512, 513, and 514 are different from the fifth to eighth sides 521, 522, 523, and 524 only in that they are arranged at the left area versus the right area of the display panel 100, description of technical features of the fifth to eighth sides 521, 522, 523, and 524 that is the same as those of the first to fourth sides 511, 512, 513, and 514 will be omitted.

According to one example, the partition 500 may include a bent portion on at least one of the four sides. For example, the second side 512 and the fourth side 514 of the first partition 510 may respectively include bent portions 512-1 and 514-1. Therefore, two sides, e.g., top and bottom sides 512 and 514, of the four sides surrounding the left area of the display panel 100 may include bent portions to have a certain inclined angle θ with respect to a horizontal direction of the display panel 100. Similarly, for example, the second side 522 and the fourth side 524 of the first partition 520 may respectively include bent portions 522-1 and 524-1. The bent portion 512-1 may include two straight line portions, and may be formed at a point where the two straight line portions meet each other. The bent portion 512-1 may have, but is not limited to, a straight line shape, a curved shape, or a round shape.

According to one example, the inclined angle θ of the bent portion 512-1 may be varied, depending on the amount required to suppress a standing wave, and may variably be set to be 10° to 30°. For example, if a sound output area is intended for a low-pitched range or an output of a sound-generating module is large, the inclined angle θ of the bent portion 512-1 may be increased. Alternatively, if the sound output area is intended for a high pitch range or the output of the sound-generating module is small, the inclined angle θ of the bent portion 512-1 may be reduced.

According to one example, the bent portion 512-1 may reduce sound reduction between the display panel 100 and the rear structure 300. For example, sound waves, generated by vibration of the display panel 100 due to the vibration generator 200, may progress while being radially diffused from the center of the vibration generator 200. These sound waves may be referred to as "progressive waves." If these progressive waves meet at one side of the partition 500, one side of the partition 500 may be reflected to form reflected waves progressing in a direction opposite to the progressive waves. The reflected waves may overlap or may be counterbalanced with the progressive waves, whereby standing waves stagnant at a certain position without progressing may be formed. The sound pressure may be reduced by the standing waves, whereby sound output property may be deteriorated. Therefore, to reduce the sound pressure reduction caused by the standing waves generated by interference between the reflected waves and the progressive waves, the partition 500 may include a bent portion. The standing waves that cause the sound pressure reduction may be generated at a point where sizes of the progressive waves and the reflected waves are large. Therefore, the bent portion 512-1 may be arranged at the position where the waves from the sound-generating module are the largest. According to one example, the bent portion 512-1 may be bent toward the vibration generator 200.

According to one example, the first and second partitions 510 and 520 may be, but are not limited to, a double-sided tape or a single tape, e.g., including polyurethane or polyolefin, which may have a certain thickness (or height). Each of the first and second partitions 510 and 520 may have elasticity to be compressed to a certain level, and may be expressed as another term, such as an "enclosure" or a "baffle."

Figure 6:
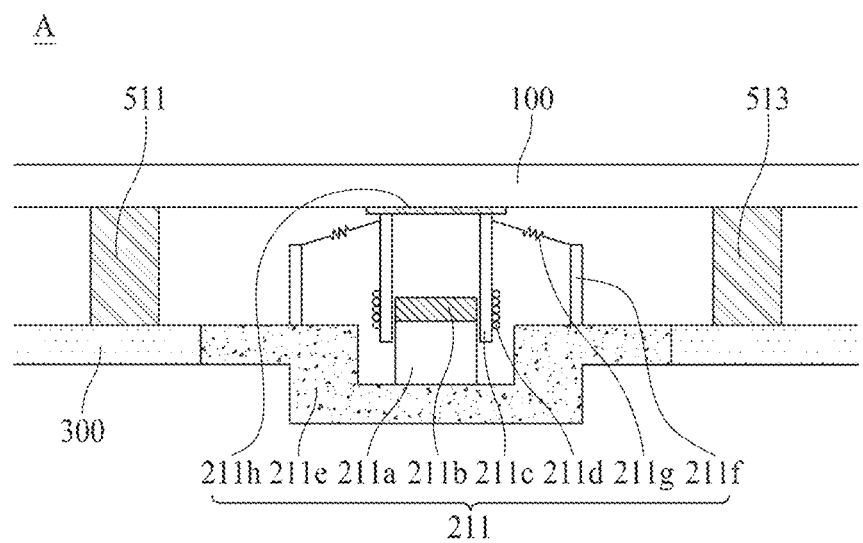
FIG. 6 is a cross-sectional view illustrating the vibration generator of FIG. 4.

FIG. 6 is a cross-sectional view illustrating the vibration generator of FIG. 4.

With reference to the example of FIG. 6, the vibration generator 200 may include at least one sound-generating module 211 fixed to the rear structure 300, for vibrating the display panel 100. At least one sound-generating module 211 may vibrate the display panel 100 in accordance with a current applied based on Fleming's Left-Hand Rule for Motors. According to one example, the vibration generator 200 may include a plurality of sound-generating modules, each of which may be arranged symmetrically based on a rear center of the display panel 100.

According to one embodiment, the sound-generating module 211 may be an actuator or an exciter. The sound-generating module 211 may include a magnet member 211a, an upper plate 211b, an ascending member 211c, a coil 211d, a module frame 211e, an outer frame 211f, a damper 211g, and a bobbin ring 211h.

The magnet member 211a may be arranged on the module frame 211e. For example, the magnet member 211a may be between the module frame 211e and the upper plate 211b. According to one embodiment, the upper plate 211b may be at one end of the magnet member 211a, and the module frame 211e may be at the other end opposite to one end of the magnet member 211a. The upper plate 211b and the module frame 211e may control a magnetic flux generated from the magnet member 211a. Therefore, when the magnet member 211a is between the upper plate 211b and the module frame 211e, a magnetic flux generated from the magnet member 211a may be concentrated. Therefore, a leakage magnet flux may be suppressed.

According to one example, the magnet member 211a may be a permanent magnet, e.g., with a ring shape or a cylinder shape. For example, a sintered magnet, which may include barium ferrite, may be used as the magnet member 211a, For example, the magnet member 211a may include, but is not limited to, an alloy casting magnet, including one or more of: $Fe_2O_3$, $BaCO_3$, strontium ferrite with an improved magnetic substance, Al, Ni, and cobalt (Co).

The upper plate 211b may be on an upper end of the magnet member 211a, and may be spaced apart from the rear structure 300. When the magnet member 211a and the upper plate 211b is inserted to the inside of the ascending member 211c with a cylinder shape, outer circumference surfaces of the magnet member 211a and the upper plate 211b may be surrounded by the ascending member 211c. Therefore, the magnet member 211a and the upper plate 211b may guide a linear reciprocating motion of the ascending member 211c. For example, the upper plate 211b may be expressed as a "center pole" or "pole pieces." According to one example, when the upper plate 211b includes a magnetic material, such as Fe, a magnetic flux density formed through the magnet member 211a may be increased.

The ascending member 211c may surround the upper plate 211b, and may be extended toward the rear structure 300. For example, the ascending member 211c may be interposed between the module frame 211e and the bobbin ring 211h while surrounding the upper plate 211b. For example, if a sound-generating current is applied to the coil 211d wound on an outer circumference surface of the ascending member 211c to form a magnetic field, the ascending member 211c may vibrate the display panel 100 according to the magnetic field, using the bobbin ring 211h as a medium. Therefore, a front surface of the ascending member 211c may be in contact with the bobbin ring 211h, and the ascending member 211c may vibrate the display panel 100 through the bobbin ring 211h depending on whether the current is applied or not. The display panel 100 may generate sound waves through vibration transferred thereto, and the sound waves may be output to the front of the display panel 100. For example, the ascending member 211c may include a material with low heat conductivity, through which the magnetic flux may pass. For example, the ascending member 211c may be a cylinder structure including one or more of: a material processed with pulp or paper, synthetic resins, such as aluminum, magnesium, an aluminum alloy, a magnesium alloy, and polypropylene, and a polyamide-based fiber.

The coil 211d may be wound on the outer circumference surface of the ascending member 211c, may surround the upper plate 211b, and may be spaced apart from the upper plate 211b. In addition, the coil 211d may be supplied with a sound-generating current. For example, the coil 211d may be expressed as a voice coil. For example, if the sound-generating current is applied to the coil 211d, the ascending member 211c may be vibrated by being guided by the damper 211g in accordance with Fleming's Left-Hand Rule for Motors, based on the applied magnetic field formed around the coil 211d and an external magnetic field formed around the magnet member 211a. For example, the magnetic flux generated by the magnetic field may flow along a closed-loop connected to the coil 211d, the module frame 211e, the magnet member 211a, the upper plate 211b, and back to the coil 211d again. Therefore, the ascending member 211c may be vibrated while being guided by the damper 211g to vibrate the display panel 100.

According to one example, a sound-generating current may be supplied to the coil 211d based on a sound signal for a sound-generating period, and the ascending member 211c, in which the coil 211d may be wound, may move while being guided by the upper plate 211b. For example, the term "sound-generating period" means a time period when the sound signal is supplied from a sound driver to the sound-generating module 211. Therefore, the sound-generating module 211 may vibrate the display panel 100 during the sound-generating period.

According to one example, if a touch pressure is applied to the display panel 100, the ascending member 211c, which may be in contact with the display panel 100, may move, and an induced current may be generated in the coil 211d in accordance with movement of the coil 211d wound on the ascending member 211c. For example, the induced current may be generated in the coil 211d for a touch sensing period, and the sound-generating module 211 may be used as a touch sensor for the touch sensing period. For example, the term "touch sensing period" means a time period when the touch pressure is applied to the display panel 100. Therefore, the touch sensor may be connected to the coil 211d of the sound-generating module 211 to sense a touch pressure based on the induced current generated in the coil 211d.

The module frame 211e may be fixed to the rear structure 300 such that it may be partially inserted into the hole, e.g., borehole, provided in the rear structure 300, and may support the sound-generating module 211. For example, a rear surface of the module frame 211e may be partially protruded toward the rear of the rear structure 300, and a front surface of the module frame 211e may be partially recessed as much as the protruded portion of the rear surface. The module frame 211e may accommodate the magnet member 211a and the upper plate 211b in the recessed portion of the front surface. For example, the recessed portion of the module frame 211e may surround sides and lower surfaces of the magnetic member 211a and the upper plate 211b.

According to one example, the module frame 211e may serve as a lower plate arranged below the magnet member 211a. For example, the module frame 211e may include a material having magnetism, such as Fe. Therefore, the sound-generating module 211 may not include a separate lower plate, and the upper plate 211b and the module frame 211e may be arranged above and below the magnet member 211a to increase a magnetic flux density formed through the magnet member 211a. As a result, the sound-generating module 211 may improve vibration property through upper plate 211b and the module frame 211e.

The outer frame 211f may be extended from the outside of an upper end of the module frame 211e to the display panel 100. The outer frame 211f may be spaced apart from the ascending member 211c in parallel with the ascending member 211c. An upper portion of the outer frame 211f may be connected to the damper 211g to support one end of the damper 211g.

The damper 211g may be between the outer frame 211f and the ascending member 211c. For example, the damper 211g may be between an upper end of the outer frame 211f and an upper end of the ascending member 211c. The damper 211g may be expressed as other terms, such as a "spider," a "suspension," and an "edge."

According to one example, one end of the damper 211g may be connected to the upper end of the outer frame 211f, and the other end of the damper 211g may be connected to an outer side above the ascending member 211c. The damper 211g may be formed with a corrugated structure between the one end and the other end, and therefore may control vibration of the ascending member 211c by being contracted and relaxed in accordance with up-and-down movement of the ascending member 211c. Therefore, the damper 211g may be connected between the ascending member 211c and the outer frame 211f to restrict a vibration distance of the ascending member 211c through a restoring force. For example, when the ascending member 211c is vibrated at a certain distance or more, or is vibrated at a certain distance or less, the ascending member 211c may return to the original position through the restoring force of the damper 211g.

The bobbin ring 211h may be on the front surface of the ascending member 211c, and may to transfer ascending (or vibration) of the ascending member 211c to the rear surface of the display panel 100. According to one example, the bobbin ring 211h may be a plate-shaped member of a ring shape attached to the front surface of the ascending member 211c, or may be a circular plate member covering the entire surface of the ascending member 211c.

According to one example, the bobbin ring 211h may bond the display panel 100 to the sound-generating module 211. For example, the bobbin ring 211h may be embodied as a double-sided tape. If the bobbin ring 211h is embodied as a double-sided tape, a rework may be easier than when the bobbin ring 211h is embodied as a resin. If the bobbin ring 211h is embodied as a double-sided tape, it may be advantageous to easily perform a rework when display panel 100 and the sound-generating module 211 are not bonded to each other normally. Also, if the bobbin ring 211h is embodied as a double-sided tape, a process may be easier than when the bobbin ring 211h is embodied as a resin. Therefore, the bobbin ring 211h may bond the sound-generating module 211 to the display panel 100 while blocking heat generated from the sound-generating module 211 from being transferred to the display panel 100, thereby efficiently transferring the vibration of the sound-generating module 211 to the display panel 100.

Figure 7:
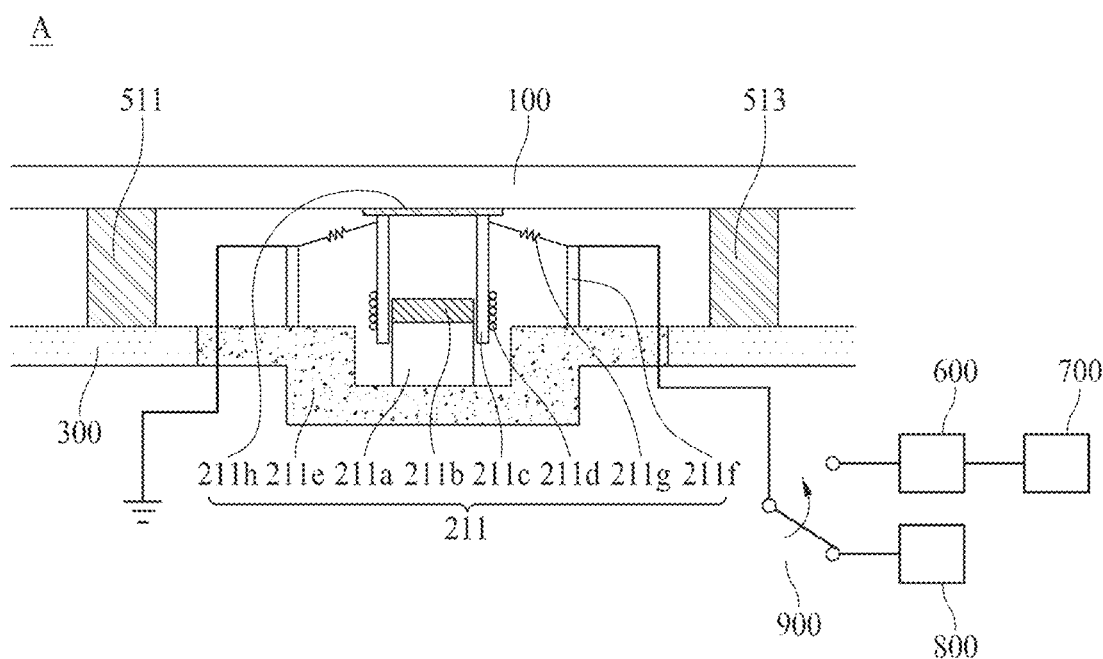
FIG. 7 is a view illustrating a touch sensor, a touch controller, and a sound driver in a display apparatus according to one embodiment of the present disclosure.

FIG. 7 is a view illustrating a touch sensor, a touch controller, and a sound driver in a display apparatus according to one embodiment of the present disclosure.

With reference to the example of FIG. 7, the display apparatus 10 may further include a touch sensor 600, a touch controller 700, and a sound driver 800. The touch sensor 600 may output a touch sensing value by sensing a touch signal generated from at least one sound-generating module 211 by a touch pressure applied to the display panel 100. For example, if the touch pressure is applied to the display panel 100, the touch pressure may be transferred to each of the first to third sound-generating modules 211, 212, and 213, and an induced current may be generated in each of the first to third sound-generating modules 211, 212, and 213. For example, when a transfer time of the touch pressure applied to the display panel 100 is varied depending on the distance on the display panel 100, different induced currents may be generated in the first to third sound-generating modules 211, 212, and 213 with respect to one touch pressure. The touch sensor 600 may be connected to a coil of each of the first to third sound-generating modules 211, 212, and 213 to sense an induced voltage applied to both ends of the coil in accordance with the induced current flowing to the coil. For example, the touch sensor 600 may sense the touch signal generated from each of the first to third sound-generating modules 211, 212, and 213 by sensing the induced voltage applied to both ends of the coil. The touch sensor 600 may sense the touch signal of each of the first to third sound-generating modules 211, 212, and 213, and may provide the touch sensing value to the touch controller 700.

The touch controller 700 may receive the touch sensing value from the touch sensor 600. According to one example, the touch controller 700 may generate and output touch position data based on a time difference of the touch sensing values for the plurality of sound-generating modules. For example, the touch position data may include information indicating that a touch pressure has been generated in a touch area corresponding to one of the plurality of sound-generating modules. For example, the touch controller 700 may calculate a touch transfer time from the touch sensing value of each of the plurality of sound-generating modules based on a reference time, and may determine that the touch pressure has been generated in the touch area corresponding to one of the plurality of sound-generating modules. For example, the term "reference time" means the time when the touch pressure is generated at a point of the display panel 100, or the time when the touch signal starts to be received. For example, the term "touch transfer time" means the time from the reference time to the time when the touch pressure is transferred to each of the plurality of sound-generating modules.

According to one example, the touch controller 700 may calculate a touch transfer time from the reference time and the touch sensing value by receiving the touch sensing value of each of the first to third sound-generating modules 211, 212, and 213 from the touch sensor 600. The touch controller 700 may determine the position where the touch pressure has been generated on the display panel 100, and may generate touch position data by mutually comparing the touch transfer time of each of the first to third sound-generating modules 211, 212, and 213. For example, the touch controller 700 may determine that the touch pressure has been generated in the position relatively adjacent to the sound-generating module having the shortest touch transfer time by mutually comparing the touch transfer time of each of the first to third sound-generating modules 211, 212, and 213. If the touch transfer time of the first sound-generating module 211 is the shortest, the touch controller 700 may generate touch position data by determining that the position (or touch area) where the touch pressure has been generated may be closer to the first sound-generating module 211 than to the second and third sound-generating modules 212 and 213. For example, the touch area of the display panel 100, which may correspond to each of the first to third sound-generating modules 211, 212, and 213, may correspond to the touch area of the display panel 100, which may be relatively close to each of the first to third sound-generating modules 211, 212, and 213. The display apparatus 10 may interpret an input signal based on the touch position data.

According to one example, the display panel 100 may include a plurality of touch areas, and each of the plurality of sound-generating modules may correspond to each of the plurality of touch areas. The plurality of touch areas may be used as input buttons of the input device. For example, the touch sensor 600 may output the touch sensing value by sensing the touch signal from each of the sound-generating modules, and the touch controller 700 may determine the touch area where the touch area has been generated, by generating touch position data based on the touch sensing value. The touch controller 700 may sense the touch pressure of the touch area corresponding to the sound-generating module, from which the induced current has been first generated, among the plurality of sound-generating modules. As a result, the display apparatus 10 may receive the input signal, without a separate input device, using the plurality of touch areas as input buttons of the input device.

According to one example, the display apparatus 10 may use the display area of the display panel 100 as the input button of the input device. For example, if a touch pressure is generated in the display area of the display panel 100, the touch sensor 600 may generate the touch sensing value of each of the first to third sound-generating modules 211, 212, and 213, and may provide the generated touch sensing value to the touch controller 700; and the touch controller 700 may generate touch position data by calculating a touch transfer time based on the touch sensing value. For example, the touch position data may include information indicating that the touch pressure has been generated in the touch area corresponding to one of the first to third sound-generating modules 211, 212, and 213. Therefore, the plurality touch areas of the display panel 100 may be respectively used as the plurality of input buttons. If the touch pressure may be generated in each of the plurality of touch areas, the display apparatus 10 may receive the corresponding input signal. As a result, the display apparatus may receive the input signal through the display area of the display panel 100, even without providing the input device separately, and a design aesthetic sense may be improved by omitting the space where the input device would be separately arranged.

According to one example, the touch controller 700 may generate and output touch intensity data based on a size of the touch sensing value generated from each of the plurality of sound-generating modules. For example, the touch intensity data may include information on a size of the touch pressure. The display apparatus 10 may interpret the input signal based on the touch intensity data.

According to one example, the touch controller 700 may compare a reference value with the touch sensing value, may generate first touch intensity data if the touch sensing value is a reference value or more, and may generate second touch intensity data if the touch sensing value is less than the reference value. For example, the term "reference value" means a reference value for the size of the touch sensing value, and the size of the touch sensing value may be proportional to intensity of the touch pressure. For example, if a touch pressure stronger than reference intensity is generated in the display panel 100, the touch controller 700 may generate and output the first touch intensity data; and if a touch pressure weaker than the reference intensity is generated in the display panel 100, the touch controller 700 may generate and output the second touch intensity data. If a plurality of touch pressures having their respective intensities are generated in the same touch area, the display apparatus 10 may receive a plurality of input signals based on the touch intensity data. As a result, the display apparatus 10 may receive a plurality of input signals through one input button (or one touch area).

According to another example, the touch controller 700 may generate touch intensity data by comparing first and second reference values with the touch sensing value. For example, it may be presumed that the second reference value is greater than the first reference value. For example, if the touch sensing value is the second reference value or more, the touch controller 700 may generate the first touch intensity data; if the touch sensing value is the first reference value or more, and is less than the second reference value, the touch controller 700 may generate the second touch intensity data; and if the touch sensing value is less than the first reference value, the touch controller 700 may generate third touch intensity data. As such, the touch controller 700 may receive a plurality of input signals through one input button (or one touch area) in accordance with a design change of the reference values.

The sound driver 800 may supply a sound signal to each of the plurality of sound-generating modules. For example, the sound driver 800 may extract sound data based on image input data displayed on the display panel 100. For example, the sound data may include frequency band information of a sound. The sound driver 800 may generate the sound signal based on the sound data, and may provide the sound signal to the plurality of sound-generating modules.

According to one example, the display apparatus 10 may further include a selector (or switch) (not shown) for connecting each of the plurality of sound-generating modules to the touch sensor 600 or the sound driver 800. The selector may select an element (or node) connected to the sound-generating module 211 through a switch member 900 for connecting the sound-generating module 211 with the touch sensor 600 or the sound driver 800.

For example, the selector may connect each of the plurality of sound-generating modules to the touch sensor 600 for a touch sensing period, and may connect each of the plurality of sound-generating modules to the sound driver 800 for a sound-generating period. For example, the term "touch sensing period" means a time period when a touch pressure is applied to the display panel 100. Therefore, the touch sensor 600 may be connected to the coil 211d of the sound-generating module 211 for the touch sensing period to sense the touch pressure based on an induced current generated in the coil 211d. The term "sound-generating period" means a time period when the sound signal is supplied from the sound driver 800 to the sound-generating module 211. Therefore, the sound-generating module 211 may output the sound toward the front of the display panel 100 by vibrating the display panel 100 during the sound-generating period.

According to one example, the display apparatus 10 may maintain the sound-generating period while providing the sound signal to the vibration generator 200 through the sound driver 800, and then may switch from the sound-generating period to the touch sensing period by controlling the switch member 900 through the selector if the touch pressure is applied to the display panel 100. Therefore, the display apparatus 10 may receive the input signal according to the touch pressure by switching from the sound-generating period to the touch sensing period if the touch pressure is applied to the display panel 100.

Figure 8:
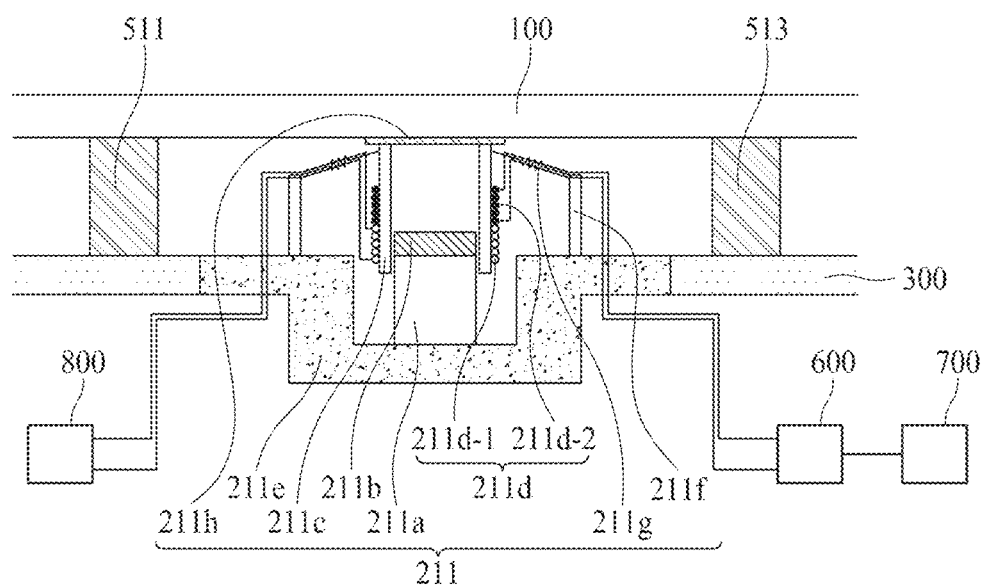
FIG. 8 is a view illustrating another example of a vibration generator in a display apparatus according to one embodiment of the present disclosure.
Figure 9:
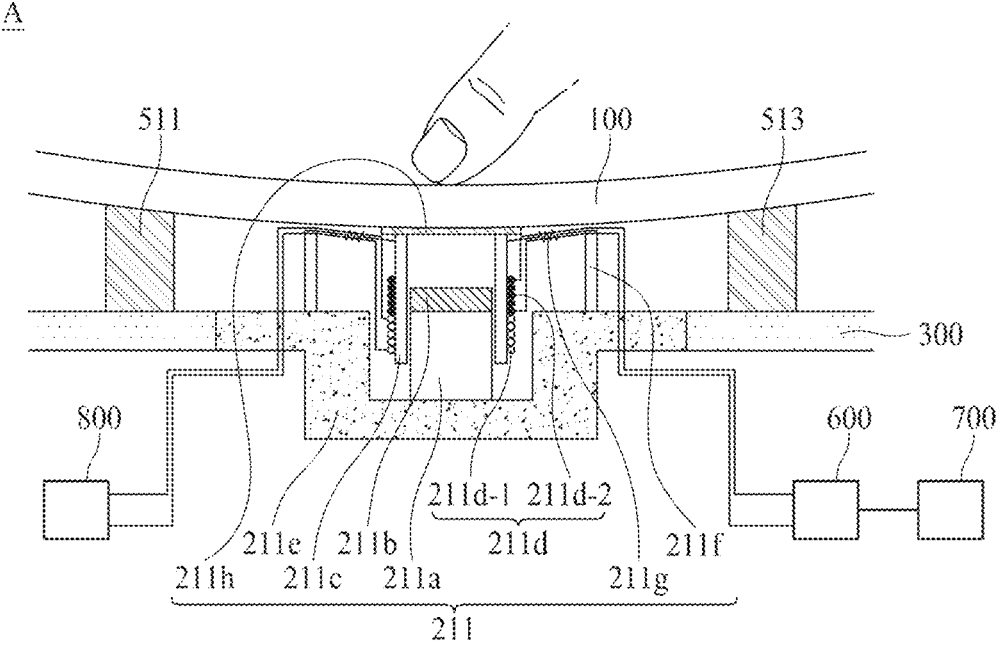
FIG. 9 is a view illustrating a state in which a touch pressure is generated in the vibration generator of FIG. 8.

FIG. 8 is a view illustrating another example of a vibration generator in a display apparatus according to one embodiment of the present disclosure. FIG. 9 is a view illustrating a state in which a touch pressure is generated in the vibration generator of FIG. 8.

With reference to the examples of FIGS. 8 and 9, the vibration generator 200 may include at least one sound-generating module 211 vibrating the display panel 100. The sound-generating module 211 may include a magnet member 211a, an upper plate 211b, an ascending member 211c, a coil 211d, a module frame 211e, an outer frame 211f, a damper 211g, and a bobbin ring 211h.

The magnet member 211a may be on the module frame 211e. For example, the magnet member 211a may be between the module frame 211e and the upper plate 211b. According to one embodiment, the upper plate 211b may be at one end of the magnet member 211a, and the module frame 211e may be at the other end opposite to one end of the magnet member 211a. The upper plate 211b and the module frame 211e may control a magnetic flux generated from the magnet member 211a.

The upper plate 211b may be on an upper end of the magnet member 211a, and may be spaced apart from the rear structure 300. When the magnet member 211a and the upper plate 211b are inserted to the inside of the ascending member 211c with a cylinder shape, outer circumference surfaces of the magnet member 211a and the upper plate 211b may be surrounded by the ascending member 211c. Therefore, the magnet member 211a and the upper plate 211b may guide a linear reciprocating motion of the ascending member 211c.

The ascending member 211c may surround the upper plate 211b, and may be extended toward the rear structure 300. For example, the ascending member 211c may be between the module frame 211e and the bobbin ring while surrounding the upper plate 211b. For example, if a sound-generating current is applied to the coil 211d wound on an outer circumference surface of the ascending member 211c to form a magnetic field, the ascending member 211c may vibrate the display panel 100 according to the magnetic field, using the bobbin ring 211h as a medium.

The coil 211d may be wound on the outer circumference surface of the ascending member 211c, may surround the upper plate 211b, and may be spaced apart from the upper plate 211b. According to one example, the coil 211d may include first and second coils 211d-1 and 211d-2.

The first coil 211d-1 may be electrically connected to the sound driver 800 while surrounding the outer circumference surface of the ascending member 211c. For example, the first coil 211d-1 may be wound on the outer circumference surface of the ascending member 211c, may surround the upper plate 211b, may be spaced apart from the upper plate 211b, and may be supplied with a sound-generating current from the sound driver 800. For example, if the sound-generating current is applied to the first coil 211d-1, the ascending member 211c may be vibrated by being guided by the damper 211g in accordance with Fleming's Left-Hand Rule for Motors based on the applied magnetic field formed around the coil 211d and an external magnetic field formed around the magnet member 211a. For example, the magnetic flux generated by the magnetic field may flow along a closed-loop connected to the first coil 211d-1, the module frame 211e, the magnet member 211a, the upper plate 211b, and back to the first coil 211d-1 again. Therefore, the ascending member 211c may be vibrated while being guided by the damper 211g to vibrate the display panel 100.

According to one example, a sound-generating current may be supplied to the first coil 211d-1 based on a sound signal for a sound-generating period, and the ascending member 211c, in which the first coil 211d-1 may be wound, may move while being guided by the upper plate 211b. For example, the term "sound-generating period" means a time period when the sound signal is supplied from the sound driver 800 to the sound-generating module 211. Therefore, the sound-generating module 211 may vibrate the display panel 100 during the sound-generating period.

The second coil 211d-2 may electrically be connected to the touch sensor 600 while surrounding the outer circumference surface of the ascending member 211c. For example, if a touch pressure is applied to the display panel 100, the ascending member 211c, which may be in contact with the display panel 100, may move; and an induced current may be generated in the second coil 211d-2 in accordance with movement of the second coil 211d-2 wound on the ascending member 211c. For example, the induced current may be generated in the second coil 211d-2 during a touch sensing period, and the sound-generating module 211 may be used as a touch sensor during the touch sensing period. For example, the term "touch sensing period" means a time period when the touch pressure is applied to the display panel 100. Therefore, the touch sensor 600 may be connected to the second coil 211*d*-2 of the sound-generating module 211 to sense a touch pressure based on the induced current generated in the second coil 211*d*-2.

According to one example, if the sound driver 800 provides the sound-generating current to the first coil 211*d*-1 based on the sound signal, the ascending member 211*c*, in which the first coil 211*d*-1 may be wound, may vibrate the display panel 100. At this time, when the second coil 211*d*-2 wound on the ascending member 211*c* is vibrated while the sound is being output, the induced current may also be generated in the second coil 211*d*-2. Therefore, the touch sensor 600 may sense the touch pressure applied to the display panel 100 by identifying the induced current generated in the second coil 211*d*-2 in accordance with the touch pressure from the induced current generated in the second coil 211-*d* in accordance with the sound signal of the sound driver 800. For example, the touch sensor 600 may determine whether the induced current is generated in the second coil 211*d*-2 by the sound signal of the sound driver 800, or by the touch pressure applied to the display panel 100 by previously sensing the sound signal of the sound driver 800, but is not limited to this example.

According to one example, the first coil 211*d*-1 may be closer to the upper plate 211*b* than the second coil 211*d*-2. For example, if the sound-generating current is applied to the first coil 211*d*-1, the ascending member 211*c* may be vibrated by being guided by the damper 211*g* in accordance with Fleming's Left-Hand Rule for Motors based on the applied magnetic field formed around the first coil 211*d*-1 and an external magnetic field formed around the magnet member 211*a*. For example, the magnetic flux generated by the magnetic field may flow along a closed-loop connected to the first coil 211*d*-1, the module frame 211*e*, the magnet member 211*a*, the upper plate 211*b*, and back to the first coil 211*d*-1 again. Therefore, when the first coil 211*d*-1 is closer to the upper plate 211*b* than the second coil 211*d*-2, the first coil 211*d*-1 may be arranged at a place where a magnetic flux density is higher than that of the second coil 211*d*-2. Also, the first coil 211*d*-1 may be arranged on the closed loop where the magnetic flux flows by means of the magnetic field, whereby the magnetic flux density may be improved. As such, when the first coil 211*d*-1 is closer to the upper plate 211*b* than the second coil 211*d*-2, the first coil 211*d*-1 may suppress a leakage magnetic flux, and may improve vibration property or sound output property by concentrating the magnetic flux generated from the sound-generating module 211.

As described above, the touch sensor 600 may output a touch sensing value by sensing a touch signal based on the induced current generated from the sound-generating module 211 while the sound driver 800 is supplying the sound signal to the sound-generating module 211. For example, the touch sensor 600 may output the touch sensing value by sensing the touch signal based on the induced current generated from the second coil 211*d*-2 of the sound-generating module 211 while the sound driver 800 is supplying the sound signal to the first coil 211*d*-1 of the sound-generating module 211. For example, the display apparatus 10 may sense intensity of the touch area and touch pressure on the display panel 100 while outputting the sound to the front of the display panel 100. As described above, the display apparatus 10 may provide a more intuitive interface by performing sound output and touch sensing at the same time.

The module frame 211*e* may be fixed to the rear structure 300, may be partially inserted into the hole, e.g., borehole, provided in the rear structure 300, and may support the sound-generating module 211. For example, a rear surface of the module frame 211*e* may be partially protruded toward the rear of the rear structure 300, and a front surface of the module frame 211*e* may be partially recessed as much as the protruded portion of the rear surface. The module frame 211*e* may accommodate the magnet member 211*a* and the upper plate 211*b* in the recessed portion of the front surface. For example, the recessed portion of the module frame 211*e* may surround sides and lower surfaces of the magnetic member 211*a* and the upper plate 211*b*.

The outer frame 211*f* may be extended from the outside of an upper end of the module frame 211*e* to the display panel 100. The outer frame 211*f* may be spaced apart from the ascending member 211*c* in parallel with the ascending member 211*c*. An upper portion of the outer frame 211*f* may be connected to the damper 211*g*, and may support one end of the damper 211*g*.

The damper 211*g* may be between the outer frame 211*f* and the ascending member 211*c*. For example, the damper 211*g* may be between an upper end of the outer frame 211*f* and an upper end of the ascending member 211*c*.

The bobbin ring 211*h* may be on the front surface of the ascending member 211*c*, and may transfer an ascension (or vibration) of the ascending member 211*c* to the rear surface of the display panel 100. According to one example, the bobbin ring 211*h* may bond the display panel 100 to the sound-generating module 211, and may block heat generated from the sound-generating module 211 from being transferred to the display panel 100.

Figure 10:
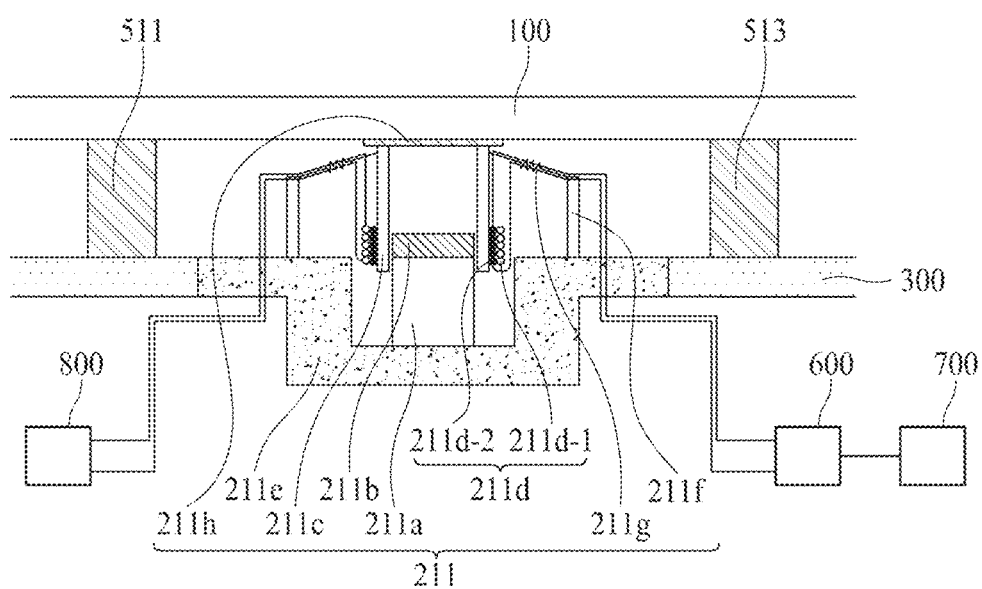
FIG. 10 is a view illustrating other example of a vibration generator in a display apparatus according to one embodiment of the present disclosure.

FIG. 10 is a view illustrating other example of a vibration generator in a display apparatus according to one embodiment of the present disclosure.

For example, the vibration generator of FIG. 10 may be different from the vibration generator of FIGS. 8 and 9 only in elements of the coil 211*d*. Thus, the same elements as those of the aforementioned description will briefly be described or omitted.

With reference to the example of FIG. 10, the coil 211*d* may be wound on the outer circumference surface of the ascending member 211*c*, may surround the upper plate 211*b*, and may be spaced apart from the upper plate 211*b*. The coil 211*d* may include first and second coils 211*d*-1 and 211*d*-2.

According to one example, the second coil 211*d*-2 may be wound on the outer circumference surface of the ascending member 211*c* in contact with the ascending member 211*c*, and the first coil 211*d*-1 may be wound on the outer circumference surface of the ascending member 211*c* while surrounding the second coil 211*d*-2. For example, when the first coil 211*d*-1 covers the second coil 211*d*-2, the first and second coils 211*d*-1 and 211*d*-2 may be doubly wound (e.g., may both be wound) on the outer circumference surface of the ascending member 211*c*. For example, if a length of the wound first coil 211*d*-1 is increased, a magnetic flux density generated from the sound-generating module 211 may be increased. As such, when the first coil 211*d*-1 is wound on the outside of the second coil 211*d*-2, the wound first coil 211*d*-1 may be longer than the wound second coil 211*d*-2. For example, a force generated when a current flows to the coil may be determined through the following Equation 1.

$$F = l^* 1^* B \qquad \text{[Equation 1]}$$

For example, 'F' means a force generated when a current flows to a coil, 'l' means a current flowing to a coil, '1' means a length of a coil, and 'B' means intensity of a magnetic field formed when a current flows to a coil. Therefore, if a wound coil is long, a force generated when a current flows to the coil may be increased. As a result, when the wound first coil 211$d$-1 is longer than the wound second coil 211$d$-2, it may be possible to suppress a leakage magnetic flux, and to improve vibration property or sound output property by concentrating the magnetic flux generated from the sound-generating module 211.

According to another example, the first coil 211$d$-1 may be wound on the outer circumference surface of the ascending member 211$c$ in contact with the ascending member 211$c$, and the second coil 211$d$-2 may be wound on the outer circumference surface of the ascending member 211$c$ while surrounding the first coil 211$d$-1. For example, when the second coil 211$d$-2 covers the first coil 211$d$-1, the first and second coils 211$d$-1 and 211$d$-2 may be doubly wound on the outer circumference surface of the ascending member 211$c$. For example, if a length of the wound second coil 211$d$-2 is increased, an induced voltage generated by a touch pressure may be increased. As such, when the second coil 211$d$-2 is wound on the outside of the first coil 211$d$-1, the wound second coil 211$d$-2 may be longer than the wound first coil 211$d$-1. Therefore, the induced voltage generated by the touch pressure may be increased, and touch sensitivity of the display apparatus may be improved.

Figure 11:
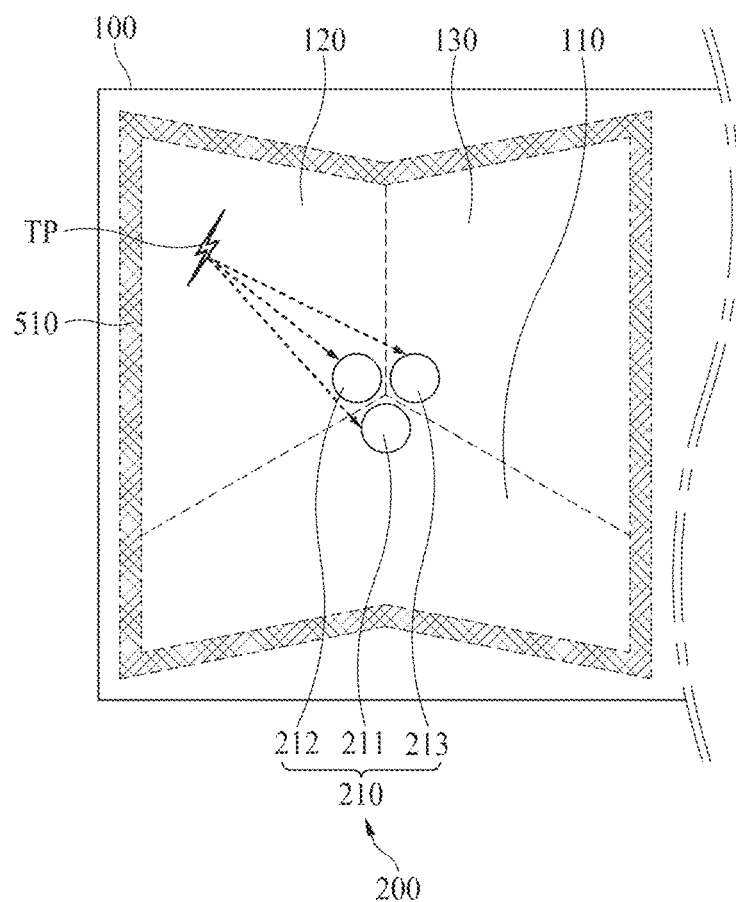
FIG. 11 is a view illustrating a process of sensing a touch signal generated from a sound-generating module by a touch pressure in a display apparatus according to one embodiment of the present disclosure.
Figure 12:
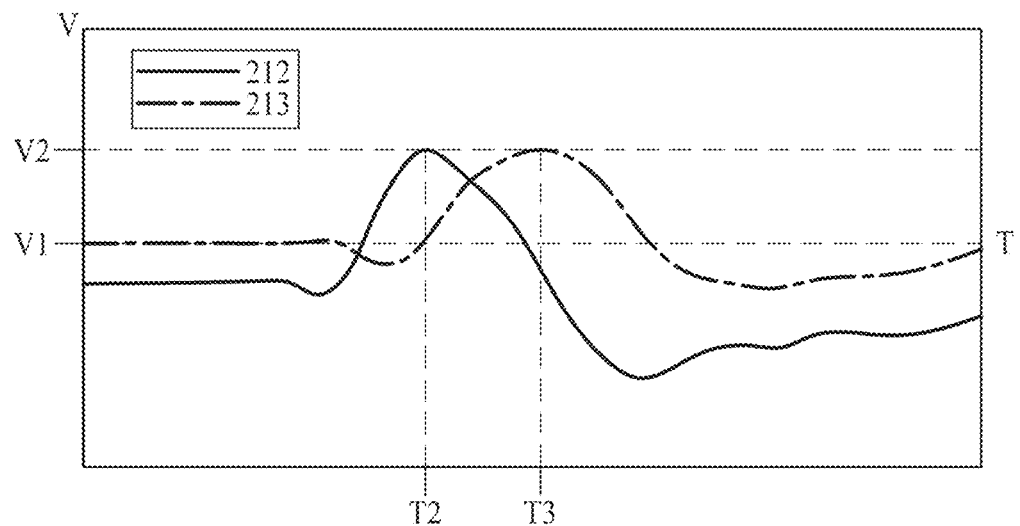
FIG. 12 is a graph illustrating a time difference of touch sensing values of a plurality of sound-generating modules in a display apparatus according to one embodiment of the present disclosure.

FIG. 11 is a view illustrating a process of sensing a touch signal generated from a sound-generating module by a touch pressure in a display apparatus according to one embodiment of the present disclosure. FIG. 12 is a graph illustrating a time difference of touch sensing values of a plurality of sound-generating modules in a display apparatus according to one embodiment of the present disclosure.

With reference to the examples of FIGS. 11 and 12, the touch sensor 600 may output a touch sensing value by sensing a touch signal generated from at least one sound-generating module 211 by a touch pressure TP applied to the display panel 100. For example, if the touch pressure TP is applied to the display panel 100, the touch pressure may be transferred to each of the first to third sound-generating modules 211, 212, and 213, and an induced current may be generated in each of the first to third sound-generating modules 211, 212, and 213. For example, when a transfer time of the touch pressure TP applied to the display panel 100 is varied depending on the distance on the display panel 100, different induced currents may be generated in the first to third sound-generating modules 211, 212, and 213 with respect to one touch pressure TP. The touch sensor 600 may be connected to a coil of each of the first to third sound-generating modules 211, 212, and 213 to sense an induced voltage applied to both ends of the coil in accordance with the induced current flowing to the coil. For example, the touch sensor 600 may sense the touch signal generated from each of the first to third sound-generating modules 211, 212, and 213 by sensing the induced voltage applied to both ends of the coil. The touch sensor 600 may sense the touch signal of each of the first to third sound-generating modules 211, 212, and 213, and may provide the touch sensing value to the touch controller 700.

The touch controller 700 may calculate a touch transfer time from a reference time and the touch sensing value by receiving the touch sensing value of each of the first to third sound-generating modules 211, 212, and 213 from the touch sensor 600. The touch controller 700 may determine the position where the touch pressure has been generated on the display panel 100, and may generate touch position data by mutually comparing the touch transfer time of each of the first to third sound-generating modules 211, 212, and 213. For example, the touch controller 700 may determine that the touch pressure has been generated in the position rela-tively close to the sound-generating module having the shortest touch transfer time by mutually comparing the touch transfer time of each of the first to third sound-generating modules 211, 212, and 213. If the touch transfer time of the first sound-generating module 211 is the shortest, the touch controller 700 may generate touch position data by determining that the position (or touch area) where the touch pressure has been generated is closer to the first sound-generating module 211 than the second and third sound-generating modules 212 and 213. For example, the touch area of the display panel 100, which may correspond to each of the first to third sound-generating modules 211, 212, and 213, may correspond to the touch area of the display panel 100, which may be relatively close to each of the first to third sound-generating modules 211, 212, and 213. The display apparatus 10 may interpret an input signal based on the touch position data.

As shown in FIG. 12, the touch controller 700 may calculate a touch transfer time T from the reference time and the touch sensing value by receiving the touch sensing value of each of the second and third sound-generating modules 212 and 213. For example, the term "reference time" means the time when the touch pressure is generated or the touch signal starts to be received, and the term "touch transfer time T" means the time from the reference time to the time when the touch pressure is transferred to each of the plurality of sound-generating modules. The time when the touch pressure is transferred to each of the plurality of sound-generating modules means the time when the induced voltage applied to both ends of the coil is sensed due to the induced current generated in the coil of each of the plurality of sound-generating modules.

For example, a first voltage V1 may be maintained at both ends of the coil of the second sound-generating module 212 when there is no touch pressure, and then an induced voltage equivalent to a second voltage V2 may be generated after a touch transfer time T2 when the touch pressure TP is generated. An induced voltage equivalent to the second voltage V2 may be generated at both ends of the coil of the third sound-generating module 213 after a touch transfer time T3 when the touch pressure TP is generated. As such, the touch controller 700 may determine that the touch transfer time T2 of the second sound-generating module 212 is shorter than the touch transfer time T3 of the third sound-generating module 213, and may determine that the touch pressure TP has been generated in the position closer to the second sound-generating module 212 than the third sound-generating module 213 by comparing the touch transfer time T2 of the second sound-generating module 212 with the touch transfer time T3 of the third sound-generating module 213. As such, the touch controller 700 may generate touch position data including information indicating that the touch pressure TP has been generated in the area closest to one of the plurality of sound-generating modules.

According to one example, the display panel 100 may include first to third touch areas 110, 120, and 130, and each of the first to third sound-generating modules 211, 212, and 213 may respectively correspond to each of the first to third touch areas 110, 120, and 130. The first to third touch areas 110, 120, and 130 may be used as input buttons of the input device. For example, if the touch pressure TP is generated in the second touch area 120 of the display panel 100, the touch sensor 600 may generate a touch sensing value of each of the first to third sound-generating modules 211, 212, and 213, and may provide the generated touch sensing value to the touch controller 700. The touch controller 700 may calculate the touch transfer time based on the touch sensing value, and may determine that the touch transfer time of the second sound-generating module 211 is the shortest. Therefore, the touch controller 700 may generate touch position data including information indicating that the touch pressure TP has been generated in the second touch area 120 corresponding to the second sound-generating module 212. Therefore, the first to third touch areas 110, 120, and 130 of the display panel 100 may be used as first to third input buttons, and the display apparatus 10 may receive an input signal corresponding to a touch pressure of each of the first touch areas 110, 120, and 130 if the touch pressure is generated in each of the first to third touch areas 110, 120, and 130. As such, the display apparatus 10 may receive the input signal through the display area of the display panel 100, even without providing the input device separately, and a design aesthetic sense may be improved by omitting the space where the input device would be separately arranged.

Figure 13:
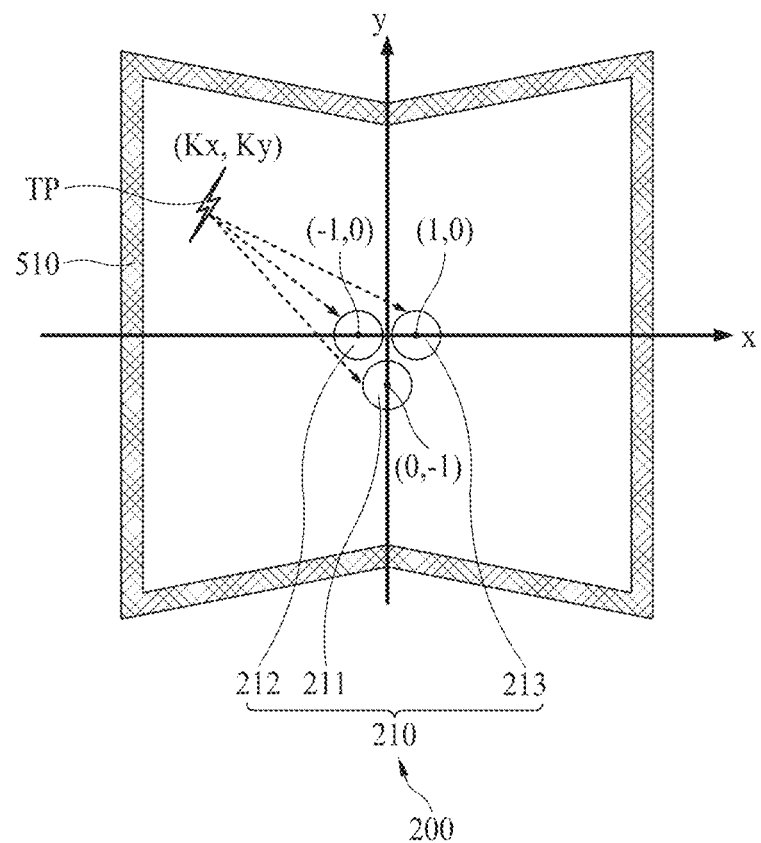
FIG. 13 is a view illustrating a process of calculating two-dimensional plane coordinate data based on a touch sensing value in a display apparatus according to one embodiment of the present disclosure.

FIG. 13 is a view illustrating a process of calculating two-dimensional plan coordinate data based on a touch sensing value in a display apparatus according to one embodiment of the present disclosure.

With reference to the example of FIG. 13, the touch controller 700 may calculate two-dimensional plane coordinate data based on first to third touch sensing values for the first to third sound-generating modules 211, 212, and 213. For example, supposing that the first sound-generating module 211 is arranged at a position of (−1,0) on a two-dimensional plane, the second sound-generating module 212 may be arranged at a position of (1,0) on a two-dimensional plane, and the third sound-generating module 213 may be arranged at a position of (0, −1) on a two-dimensional plane, a touch pressure TP generated in any one x-y coordinate position (Kx,Ky) of the display panel 100 may be transferred to each of the first to third sound-generating modules 211, 212, and 213. At this time, the two-dimensional plane coordinates where the touch pressure TP has been generated may be calculated according to the following simultaneously-applied Equations 2-4.

$$(Kx+1)^2 + Ky^2 = (T1*Vk)^2 \quad \text{[Equation 2]}$$

$$(Kx-1)^2 + Ky^2 = (T2*Vk)^2 \quad \text{[Equation 3]}$$

$$Kx^2 + (Ky+1)^2 = (T3*Vk)^2 \quad \text{[Equation 4]}$$

For example, 'Vk' means a propagation velocity of the touch pressure TP transferred on the display panel 100, and each of 'T1' to 'T3' means a touch transfer time of each of the first to third sound-generating modules 211, 212, and 213. Vk corresponds to a constant that can be measured through property of the display panel 100, and T1 to T3 can be calculated as described above. Therefore, the touch controller 700 may calculate an x-y coordinate position (Kx, Ky) where a touch pressure corresponding to unknowns has been generated, through the above simultaneously-applied equations. The touch controller 700 may determine that the touch pressure has been generated in the touch area corresponding to two-dimensional plane coordinate data by calculating the two-dimensional plane coordinate data based on the first to third touch sensing values of the first to third sound-generating modules 211, 212, and 213. As a result, the touch controller 700 may receive a plurality of input signals corresponding to the touch area corresponding to the two-dimensional plane coordinate data.

Therefore, the display apparatus 10 may receive the plurality of input signals through the plurality of touch areas of the display panel 100, even without providing the input device separately. Also, a design aesthetic sense may be improved by omitting the space where the input device would be separately arranged.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
   a display panel;
   a vibration generator comprising a plurality of sound-generating modules configured to vibrate the display panel, the plurality of sound-generating modules being configured as touch sensors for sensing a touch pressure applied to the display panel;
   a sound driver configured to supply a sound signal to each of the plurality of sound-generating modules; and
   a selector configured to connect each of the plurality of sound-generating modules to the touch sensor or the sound driver,
   wherein each of the plurality of sound-generating modules comprises:
      a magnet member,
      an ascending member surrounding a portion of the magnet member, and
      a coil wound to surround an outer circumference surface of the ascending member,
   wherein the selector is further configured to electrically connect the coil of each of the plurality of sound-generating modules to the touch sensor during a touch sensing period, and
   wherein the selector is further configured to connect the coil of each of the plurality of sound-generating modules to the sound driver during a sound generating period.

2. The display apparatus of claim 1, wherein the touch sensors are configured to output a touch sensing value by sensing a touch signal based on an induced current generated from each of the plurality of sound-generating modules by the touch pressure.

3. The display apparatus of claim 1, wherein:
   the display panel comprises a plurality of touch areas; and
   each of the plurality of sound-generating modules respectively corresponds to each of the plurality of touch areas.

4. The display apparatus of claim 1, further comprising a touch controller configured to generate and output touch position data based on a time difference of the touch sensing value of each of the plurality of sound-generating modules.

5. The display apparatus of claim 4, wherein the touch controller is further configured to sense that a touch pressure has been generated in a touch area corresponding to a sound generating module, in which an induced current has been first generated, among the plurality of sound-generating modules.

6. The display apparatus of claim 4, wherein the touch controller is further configured to:
   calculate a touch transfer time from the touch sensing value from each of the plurality of sound-generating modules, based on a reference time; and
   determine that a touch pressure has been generated in a touch area corresponding to one of the plurality of sound-generating modules, based on the touch transfer time.

7. The display apparatus of claim 4, wherein:
the plurality of sound-generating modules comprises first to third sound-generating modules; and
the touch controller is further configured to calculate and output two-dimensional plane coordinate data based on first to third touch sensing values of the first to third sound-generating modules.

8. The display apparatus of claim 4, wherein the touch controller is further configured to generate and output touch intensity data based on a size of the touch sensing value generated from each of the plurality of sound-generating modules.

9. The display apparatus of claim 8, wherein the touch controller is further configured to:
compare a reference value with the touch sensing value;
generate first touch intensity data if the touch sensing value is greater than or equal to the reference value; and
generate second touch intensity data if the touch sensing value is less than the reference value.

10. The display apparatus of claim 1, wherein:
each of the plurality of sound-generating modules further comprises:
a module frame inserted into a hole and fixed to a rear structure; and
an upper plate on the magnet member;
the magnet member is disposed on the module frame; and
the ascending member is in contact with a rear surface of the display.

11. A display apparatus, comprising:
a display panel;
a vibration generator comprising a plurality of sound-generating modules configured to vibrate the display panel, the plurality of sound-generating modules configured as touch sensors for sensing a touch pressure applied to the display panel;
a rear structure supporting the display panel, and comprising a hole into which the vibration generator is partially inserted;
a touch sensor for configured to output a touch sensing value by sensing a touch signal based on an induced current generated from each of the plurality of sound-generating modules by the touch pressure; and
a sound driver configured to supply a sound signal to each of the plurality of sound-generating modules,
wherein each of the plurality of sound-generating modules comprises:
a magnet member;
an ascending member surrounding a portion of the magnet member;
a first coil electrically connected to the sound driver, and surrounding the outer circumference surface of the ascending member; and
a second coil electrically connected to the touch sensor, and surrounding the outer circumference surface of the ascending member.

12. The display apparatus of claim 11, further comprising a touch controller configured to generate and output touch position data based on a time difference of the touch sensing value of each of the plurality of sound-generating modules.

13. The display apparatus of claim 11, wherein each of the plurality of sound-generating modules further comprises:
a module frame inserted into the hole and fixed to the rear structure, wherein the magnet member is disposed on the module frame; and
an upper plate on the magnet member,
wherein the ascending member is in contact with a rear surface of the display panel.

14. The display apparatus of claim 11, wherein the touch sensor is further configured to output the touch sensing value by sensing the touch signal based on the induced current generated from each of the plurality of sound-generating modules while the sound driver is supplying the sound signal to each of the plurality of sound-generating modules.

15. The display apparatus of claim 11, wherein the first coil is closer to the upper plate than the second coil.

16. The display apparatus of claim 11, wherein:
the second coil is wound on the outer circumference surface of the ascending member in contact with the ascending member; and
the first coil is wound on the outer circumference surface of the ascending member, and surrounds the second coil.

* * * * *